(12) United States Patent
Rosen et al.

(10) Patent No.: US 10,545,458 B2
(45) Date of Patent: Jan. 28, 2020

(54) OPTICAL SECTIONING USING A PHASE PINHOLE

(71) Applicant: B.G. NEGEV TECHNOLOGIES AND APPLICATIONS LTD., AT BEN-GURION UNIVERSITY, Beer Sheva (IL)

(72) Inventors: Joseph Rosen, Omer (IL); Roy Kelner, Omer (IL); Barak Katz, Lehavim (IL)

(73) Assignee: B.G. Negev Technologies and Applications Ltd., at Ben Gurion University, Be'er Sheva (IL)

( * ) Notice: Subject to any disclaimer, the term of this patent is extended or adjusted under 35 U.S.C. 154(b) by 330 days.

(21) Appl. No.: 15/128,356

(22) PCT Filed: Mar. 23, 2015

(86) PCT No.: PCT/IL2015/050300
§ 371 (c)(1),
(2) Date: Sep. 22, 2016

(87) PCT Pub. No.: WO2015/145428
PCT Pub. Date: Oct. 1, 2015

(65) Prior Publication Data
US 2018/0173160 A1    Jun. 21, 2018

Related U.S. Application Data

(60) Provisional application No. 61/969,354, filed on Mar. 24, 2014.

(51) Int. Cl.
| G03H 1/26 | (2006.01) |
| G03H 1/04 | (2006.01) |
| G03H 1/08 | (2006.01) |
| G03H 1/02 | (2006.01) |

(52) U.S. Cl.
CPC ............. *G03H 1/268* (2013.01); *G03H 1/041* (2013.01); *G03H 1/0443* (2013.01);
(Continued)

(58) Field of Classification Search
CPC ............ G01B 9/02047; G01B 9/02097; G01B 2290/50; G02B 21/0024; G02B 21/0052;
(Continued)

(56) References Cited

U.S. PATENT DOCUMENTS

| 3,013,467 A | 12/1961 | Minsky |
| 2007/0263226 A1* | 11/2007 | Kurtz ................... A61B 5/0059 356/492 |

(Continued)

FOREIGN PATENT DOCUMENTS

WO    WO-2013/086350 A1    6/2013

OTHER PUBLICATIONS

Conchello et al., "Optical sectioning microscopy", Nature Methods, vol. 2 No. 12, Dec. 2005, p. 920-931.*
(Continued)

*Primary Examiner* — William R Alexander
*Assistant Examiner* — Ephrem Z Mebrahtu
(74) *Attorney, Agent, or Firm* — Venable LLP; Jeffri A. Kaminski

(57) ABSTRACT

The present invention relates to an arrangement for the generation of images of optical sections of a three-dimensional (3D) volume in space such as an object, scene, or target, comprising: an illumination unit, an optical arrangement for the imaging of the object onto at least one spatially resolving detector, a scanning mechanism for scanning the entire object and a signal processing unit for the implementation of a method for digital reconstruction of a three-dimensional representation of the object from images of said object as obtained by said detector (which may be in a form (Continued)

of a hologram), wherein the optical arrangement includes a diffractive optical element (herein a phase pinhole), realized using a Spatial Light Modulator (SLM) configured to mimic an actual physical pinhole, while allowing the formation of a three-dimensional representation for a specific point of interest in said object, such that for each scanning position a single hologram or an image is recorded.

13 Claims, 3 Drawing Sheets

(52) U.S. Cl.
CPC ... *G03H 1/0866* (2013.01); *G03H 2001/0216* (2013.01); *G03H 2001/0428* (2013.01); *G03H 2001/0452* (2013.01); *G03H 2225/13* (2013.01); *G03H 2225/32* (2013.01)

(58) Field of Classification Search
CPC .... G02B 21/008; G03H 1/041; G03H 1/0443; G03H 1/06; G03H 1/0866; G03H 1/26; G03H 1/268; G03H 2001/0428; G03H 2222/36; G03H 2225/30; G03H 2225/32; G03H 2001/0452

See application file for complete search history.

(56) References Cited

U.S. PATENT DOCUMENTS

| | | | |
|---|---|---|---|
| 2013/0056910 A1* | 3/2013 | Houbertz-Krauss | B33Y 30/00 264/401 |
| 2014/0160266 A1* | 6/2014 | Wereley | G02B 21/365 348/79 |
| 2014/0168783 A1* | 6/2014 | Luebke | G02B 3/0006 359/630 |
| 2014/0320942 A1* | 10/2014 | Rosen | G03H 1/06 359/11 |

OTHER PUBLICATIONS

Rosen et al., "Fresnel incoherent correlation holography (FINCH): a review of research" Adv. Opt. Techn., vol. 1 (2012), pp. 151-169. (Year: 2012).*

M. Minsky, "Memoir on inventing the confocal scanning microscope," Scanning vol. 10, 128-138, 1988.

Amos et al., "How the confocal laser scanning microscope entered biological research," Biol. Cell. 95(6), 335-342, 2003.

Sun et al., "Broad-source image plane holography as a confocal imaging process," Appl. Opt. vol. 33, 597-602, 1994.

Chmelik et al., "Parallel-mode confocal microscope," Opt. Eng. 38(10), 1635-1639, Oct. 1, 1999.

Rosen et al., "Digital spatially incoherent Fresnel holography," Optic Letter, vol. 32, 912-914, Apr. 15, 2007.

Rosen et al., "Theoretical and experimental demonstration of resolution beyond the Rayleigh limit by FINCH fluorescence microscopic imaging," Optic Express, vol. 19, 26249-26268, Dec. 8, 2011.

International and Search Report and Written Opinion in International Application No. PCT/IL2015/050300, dated Jul. 12, 2015.

* cited by examiner

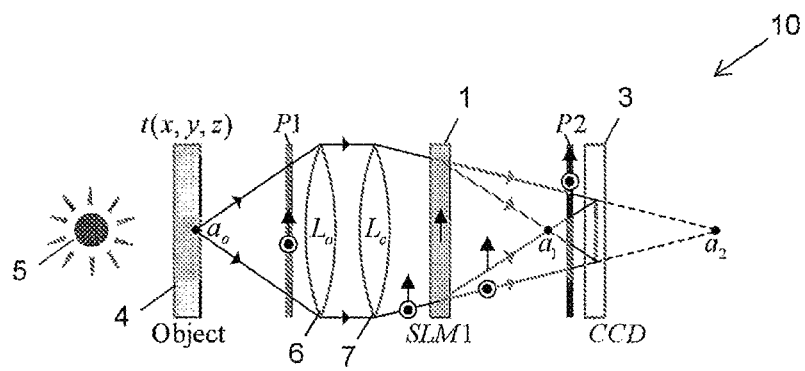
Fig. 1 (prior-art)
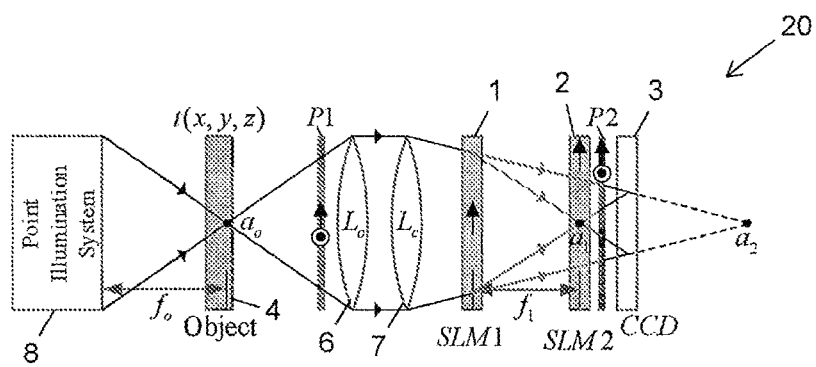
Fig. 2

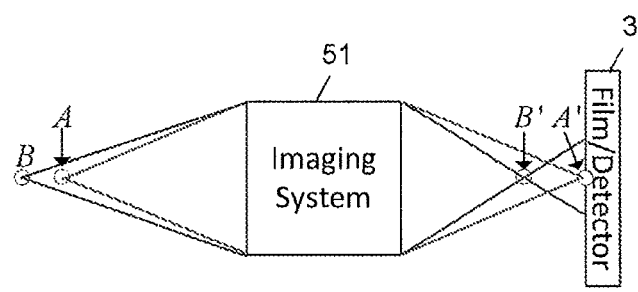
Fig. 5(a) - prior-art
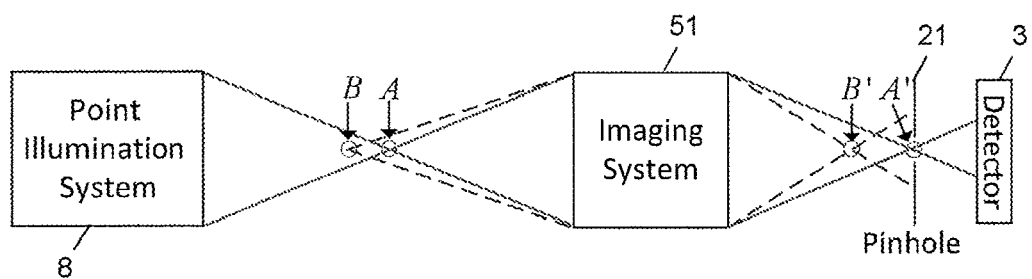
Fig. 5(b)

OPTICAL SECTIONING USING A PHASE PINHOLE

FIELD OF THE INVENTION

The present invention relates to the field of imaging systems. More particularly, the invention relates to a method and an assembly for generating images of optical sections via optical sectioning while recording information in various forms, such as Fresnel holograms.

BACKGROUND OF THE INVENTION

In order to create three-dimensional images or mappings of objects, one often uses techniques of optical sectioning. A so-called optical section is an image that contains information from a certain range of depth. Therefore, an optical system for the generation of images of optical sections performs selective imaging of those object details which are within the focal plane, while object details outside the focal plane are suppressed in the optical section image. By means of recording a series of optical section images located at different focal positions one can scan a three-dimensional (3D) object, step by step. Thus a three-dimensional representation of an object or its topography can be formed.

Confocal imaging is commonly used for microscopy due to its ability to provide optical sectioning, improved contrast, and high-image resolution (R. H. Webb, "Confocal optical microscopy," Rep. Prog. Phys. 59, 427-471, 1996). One of the first methods for the generation of optical section images was the confocal microscope described in U.S. Pat. No. 3,013,467 entitled "Microscopy Apparatus", which was issued to Marvin Minsky in 1961. Here the imaging of details from outside the focal plane is suppressed by an arrangement of confocal pinholes.

The concept of confocal microscopy was already developed by Minsky in 1955, but found widespread use in biology only a few decades later. The reason for this delay is probably due to technological limitations at that time, as confocal imaging requires scanning over the entire imaged target (M. Minsky, "Memoir on inventing the confocal scanning microscope," Scanning 10, 128-138, 1988, and W. B. Amos and J. G. White, "How the confocal laser scanning microscope entered biological research," Biol. Cell. 95(6), 335-342, 2003). Though confocal holographic systems that do not require scanning had been developed (P.-C. Sun and E. N. Leith, "Broad-source image plane holography as a confocal imaging process," Appl. Opt. 33, 597-602, 1994), they are unfortunately not suitable for fluorescence imaging (R. Chmelík and Z. Harna, "Parallel-mode confocal microscope," Opt. Eng. 38(10), 1635-1639, Oct. 1, 1999), which is commonly practiced in microscopy for biological applications.

In the recent years, a team of scientists from Ben-Gurion University (BGU) in Israel and Johns Hopkins University (JHU) in Baltimore, Md. have developed a technology, which may enable cheaper, faster, and more accurate three-dimensional imaging. The technology is named "Fresnel incoherent correlation holography" or "FINCH" for short, and it may be used in a broad range of medical applications, such as endoscopy, ophthalmology, CT scanning, X-ray imaging and ultrasounds (J. Rosen, and G. Brooker, "Digital spatially incoherent Fresnel holography," Opt. Lett. 32, 912-914, 2007).

Fresnel incoherent correlation holography (FINCH) offers resolutions beyond the Rayleigh limit and is readily suitable for fluorescence microscopy (J. Rosen, N. Siegel, and G. Brooker, "Theoretical and experimental demonstration of resolution beyond the Rayleigh limit by FINCH fluorescence microscopic imaging," Opt. Express 19, 26249-26268 2011). Yet, it lacks the optical sectioning capabilities that are most important for the imaging of thick objects. Therefore a novel confocal configuration of FINCH, capable of optical sectioning, is required.

It is an object of the present invention to provide a FINCH based method that is capable of sectioning any desired plane out of 3D object distribution.

It is another object of the present invention to provide a novel confocal microscope device that is capable of suppressing out-of-focus information from recorded holograms.

It is yet another object of the present invention to provide an optical sectioning method, using a phase pinhole, suitable for various holography systems (coherent and incoherent) as well as for non-holographic imaging systems.

Other objects and advantages of the invention will become apparent as the description proceeds.

SUMMARY OF THE INVENTION

The present invention relates to an arrangement for the generation of images of optical sections of a three-dimensional (3D) volume in space such as an object, scene, or target, comprising: an illumination unit, an optical arrangement for the imaging of the object onto at least one spatially resolving detector, a scanning mechanism for scanning the entire object and a signal processing unit for the implementation of a method for digital reconstruction of a three-dimensional representation of the object from images of said object as obtained by said detector (which may be in a form of a hologram), wherein the optical arrangement includes a diffractive optical element (herein a phase pinhole), realized using a Spatial Light Modulator (SLM) configured to mimic an actual physical pinhole, while allowing the formation of a three-dimensional representation for a specific point of interest in said object, such that for each scanning position a single hologram or an image is recorded.

According to an embodiment of the invention, the phase pinhole is a circular area of a radius set to a uniform phase modulation, wherein for every scanning point the uniform phase modulation at the pinhole region can be set to at least one phase value. For example, for a phase-shifting procedure at least three different values of uniform phase modulation are required at the pinhole region. Optionally, the phase pinhole can be surrounded by a mask of an axicon. According to some embodiments of the present invention, one can use the phase pinhole with only a single phase value and an axicon, without a phase-shifting procedure, to achieve optical sectioning.

According to an embodiment of the invention, the signal processing unit includes a hologram calculation section configured to calculate the hologram of the object based on the images captured by the at least one spatially resolving detector that is used as an image recording module. The captured images may be holograms that may contain unwanted terms and information.

According to an embodiment of the invention, the scanning mechanism is done mechanically, by moving the object in all directions.

According to an embodiment of the invention, the scanning mechanism is done electronically without any mechanical intervention. In one embodiment, in order to electronically control the position of a point illumination a beam steerer is introduced into the illumination unit as to control the position of the point source illumination, such that as the object is scanned over the x,y-plane, the imaged point over the SLM is formed at different positions, and the phase pinhole mask can be electronically centered to that point.

According to an embodiment of the invention, from each recorded hologram a single point is reconstructed using the Fresnel diffraction integral formula for a single output point, and all points from all of the recorded holograms are combined into a single image. Further, in the case of a multiple pinholes mask, from each hologram several points can be reconstructed using the Fresnel diffraction integral formula for several output points.

According to an embodiment of the invention, from each recorded hologram a reconstruction of the entire input plane of the object can be calculated; then, for each single pixel of the hologram, the maximum intensity value from all reconstructions is chosen, and a complete reconstruction of a specific x,y-plane is formed.

According to an embodiment of the invention, many points can be imaged in parallel, by illuminating multiple points on the same x,y-plane simultaneously, while a phase pinhole mask of multiple pinholes is displayed over the SLM.

In another aspect, the present invention relates to a method for the generation of images of optical sections of an object, comprising: a) imaging an illuminated object onto at least one spatially resolving detector by using an optical arrangement that includes a diffractive optical element (herein a phase pinhole) that is realized using a Spatial Light Modulator (SLM) configured to mimic an actual physical pinhole, such that light scattered or emitted from the illuminated object that passes through said phase pinhole is being imaged onto said at least one spatially resolving detector as an obtained image; and b) scanning the entire object using a scanning mechanism for providing digital reconstruction of a three-dimensional representation of the object from images of the object as obtained by said detector, while allowing the formation of a three-dimensional representation for a specific point of interest in said object, such that for each scanning position a single hologram or an image is recorded.

BRIEF DESCRIPTION OF THE DRAWINGS

In the drawings:

FIG. 1 schematically illustrates a dual-lens FINCH system, according to the prior-art;

FIG. 2 schematically illustrates a confocal FINCH system, according to an embodiment of the present invention;

FIG. 5(a) schematically illustrates standard imaging system; and

FIG. 5(b) schematically illustrates a confocal imaging system that represents Minsky's confocal solution.

DETAILED DESCRIPTION OF THE INVENTION

Figure 3:
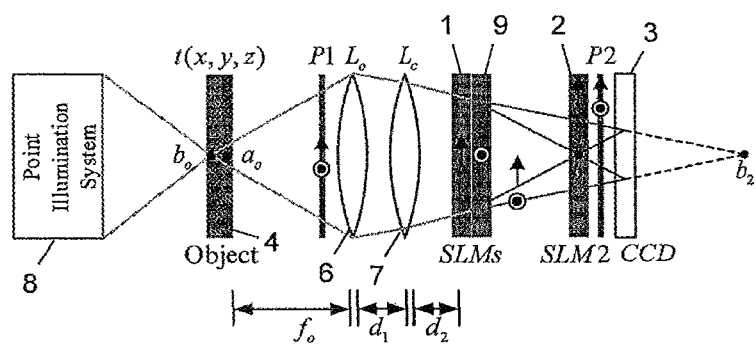
FIG. 3 schematically illustrates a confocal FINCH system, according to another embodiment of the present invention.

The present invention serves the three-dimensional, layer by layer scanning of objects with major applications in microscopy, although it is not limited to this field. The present invention allows the generation of optical section images in a particularly simple way and can be used for analysis of objects, for example, in biology, medicine or in material sciences. Thus, the invention relates to a method and an assembly for generating optical section images. The invention permits the three-dimensional (3D), layered optical scanning of objects. In the suggested method, light scattered from an illuminated object (where various methods of illumination can be used), or emitted in the case of fluorescence, is being imaged onto a detector. In addition, an arrangement, which implements the method according to the invention, is proposed.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Before discussing the proposed confocal FINCH system of the present invention, the working concept of FINCH is first briefly presented. FIG. 1 schematically illustrates a configuration of a dual-lens FINCH system 10, in accordance with the prior-art. It is assumed that an object 4 is spatially incoherent (illuminated by a light source 5); thus light beams that are emitted or scattered from two different object points cannot interfere with each other, and the system 10 is analyzed by considering a single point source object. In FIG. 1, a spherical light beam is emitted from a source point $a_o$ of object 4, located at the front focal plane of an objective lens 6 ($L_o$) and propagates into the FINCH system 10. An input polarizer P1 is set at a 45° angle to the active axis of a Spatial Light Modulator (SLM) 1, which allows the formation of two in-parallel imaging systems in a common-path single-channel configuration. SLM 1 only modulates the phase of the polarization components of the beam that are in parallel to its active axis. Polarization components of the input beam that are perpendicular to its active axis are not modulated; for them, SLM 1 is a transparent element. System 10 can thus be considered as two imaging systems, each acting with one of two orthogonal polarization components of light. In these systems, the input beam of light is collected by the objective lens 6 ($L_o$) and then further concentrated by a lens 7 ($L_c$). In one of the two systems, SLM 1 does not influence the beam, and an image is formed at the image point $a_2$. In the other, a converging diffractive lens is displayed on SLM 1 and the beam is concentrated into the image point $a_1$.

To record a hologram of the maximum achievable resolution, an image recording module, such as a charge-coupled device (CCD) 3, CMOS, or other suitable types of digital sensor, is positioned between the two image points, $a_1$ and $a_2$, so that a perfect overlap is achieved between the beam diverging from the image point $a_1$ and the beam converging toward the image point $a_2$. Note that interference can occur between these two beams, since they originate from the same point source, $a_o$, granted that the maximal optical path difference between the two is shorter than the coherence distance of the light source (B. Katz, J. Rosen, R. Kelner, and G. Brooker, "Enhanced resolution and throughput of Fresnel incoherent correlation holography (FINCH) using dual diffractive lenses on a spatial light modulator (SLM),"

Opt. Express 20(8), 9109-9121, 2012). Further, note that the output polarizer P2 is essential and is used to project the polarization components of the two beams into a common orientation. Usually, P2 is also set at a 45° angle to the active axis of SLM 1, but other angles can be used to control the relative intensity of the two beams (G. Brooker, N. Siegel, V. Wang, and J. Rosen, "Optimal resolution in Fresnel incoherent correlation holographic fluorescence microscopy," Opt. Express 19, 5047-5062, 2011). The intensity of the two-beam interference pattern is recorded by the CCD, giving rise to a 0th order term and two other terms attributed to the holographic image of $a_o$ and its twin. A phase-shifting procedure (e.g., J. Rosen, and G. Brooker, "Digital spatially incoherent Fresnel holography," Opt. Lett. 32, 912-914, 2007), utilizing SLM 1, requires at least three exposures and is performed so that only the holographic image term remains. The spatial incoherence of the object ensures that the final recorded FINCH hologram is a summation over the intensities of all point source interference patterns.

The recorded object can then be reconstructed from the hologram through a digital Fresnel propagation to a specific reconstruction distance, $z_r$ (B. Katz, J. Rosen, R. Kelner, and G. Brooker, "Enhanced resolution and throughput of Fresnel incoherent correlation holography (FINCH) using dual diffractive lenses on a spatial light modulator (SLM)," Opt. Express 20(8), 9109-9121, 2012). An additional feature of FINCH is that out-of-focus points are also recorded in the hologram. This, on one hand, can be advantageous when refocusing to planes of different depths is required, but on the other hand, it can impose noise and artifacts over the observed in-focus image.

According to an embodiment of the invention, a confocal FINCH-based solution that can section any desired plane out of the three-dimensional (3D) object distribution is proposed. In the proposed confocal FINCH system, the optical sectioning capabilities emerge due to an innovative concept that refers herein to a "phase pinhole". In brief, the phase pinhole is an SLM implemented component that imitates an actual physical pinhole, but at the same time allows the formation of a FINCH hologram for a specific point of interest in an observed object. It is important to mention that if the phase pinhole is replaced with an actual pinhole, a FINCH hologram would no longer be formed.

A detailed description of the phase pinhole, together with an in-depth presentation of the proposed confocal FINCH system will now be described. Incorporating such a phase pinhole with a non-confocal FINCH system may result in an enhanced FINCH system having optical sectioning capabilities. Notwithstanding, a non-confocal solution can be useful for any application in which the target is not actively illuminated by the observer. According to an embodiment of the invention, a confocal FINCH-based device may use an SLM based laser scanning point illumination system.

Referring now to FIG. 2, a confocal FINCH system 20 is shown in accordance with an embodiment of the present invention. In a confocal FINCH system 20, a second SLM (SLM 2) is positioned in the x,y-plane in which the image point $a_1$ is formed. Note that SLM 2 is also placed between the input and output polarizers, P1 and P2. A diffractive optical element, hereby referred to as the "phase pinhole," is displayed on SLM 2 that can be used in conjunction with the invention. The diffractive optical element is particularly convenient because it can be applied to existing microscopy without the need to carry out major alterations in the structure. As aforementioned hereinabove, this phase pinhole is considered as one of the main innovations of the system of the presented invention. The phase pinhole at the scanning point (m,n) is described by the following equation:

$$G(\vec{r}; \vec{r}_l) = \begin{cases} \exp(i\varphi_k) & |\vec{r} - \vec{r}_l - \vec{r}_s| \le r_1 \\ \exp(i\alpha|\vec{r} - \vec{r}_l - \vec{r}_s|)P\left(\frac{\vec{r}}{R_2}\right) & \text{Otherwise} \end{cases},$$

with $\vec{r}=(x, y)$, $\vec{r}_l=(am, an)$, $\vec{r}_s=(x_s,y_s)$ and is composed of the actual pinhole part, $\exp(i\varphi_k)$, which is a circular area of radius $r_1$ set to a uniform phase modulation, surrounded by a mask of an axicon, $\exp(i\alpha r)$, where $\alpha$ is a parameter proportional to the axicon angle, $$P\left(\frac{\vec{r}}{R_2}\right)$$

denotes the circular aperture of SLM 2, with a clear disk of radius $R_2$, a and b are scanning intervals in the x and y axes, respectively, and $\vec{r}_s$ is the starting point of the scanning. In the confocal FINCH system 20, for every scanning point (m,n) the uniform phase modulation at the pinhole region is set to three different $\varphi_k$ values, usually 0°, 120°, and 240°, and SLM 1 is no longer used for the phase-shifting procedure. Since the phase is changed only within the phase pinhole, any information carried by a wave that passes through SLM 2 outside the phase pinhole and does not eventually interfere with the wave modulated by the phase pinhole is lost after the phase-shifting procedure. Overall, the proposed phase pinhole can be considered as a regular pinhole for the polarization components parallel to the active axis of SLM 2 and as a clear aperture (of SLM 2 dimensions) for the orthogonal polarization components.

Accordingly, the proposed phase pinhole can perform properly even without displaying an axicon. Yet, by incorporating the axicon, light outside of the circular pinhole is actually deflected outside the sensor area. This, in turn, diminishes the amount of light that would otherwise reach a detection unit that may contain a spatially resolving detector, such as a CCD 3, and would later be removed digitally by completing the calculations of the phase-shifting procedure. Thus, the dynamic range of the CCD 3 can be better exploited when the axicon is present. Eventually, we are left mostly with the information of the interference between light that passes through the phase pinhole of SLM 2, with its orthogonal counterparts that are imaged at the point $a_2$.

In general, every optical setup must be carefully built. Each element is carefully positioned relative to the optical axis and other components, and so forth. Therefore, considering FIG. 2, the phase pinhole should be centered to the position of the image point $a_1$, which depends upon the specific position of the illuminated object point $a_o$. Theoretically, if the system is built perfectly, one can precisely control which point to illuminate, and can position the phase pinhole based on simple calculations. In practice, one may wish to compensate for impreciseness and/or aberrations via calibration. This can be done with the help of an imaging system that images the plane of SLM2, giving an opportunity to see whether the image point $a_1$ is formed over SLM2 and whether the phase pinhole is properly centered.

The above described phase pinhole can efficiently achieve optical sectioning, as will be demonstrated hereinafter. However, better results can be achieved by incorporating a point illumination system 8, forming a complete confocal FINCH system. In a confocal FINCH system 20, the object points outside the scanning spot are eliminated from the recorded hologram. First, due to the point illumination, any of the object points that are not lit (i.e., are not within the cone of light) will not be recorded. Second, all the points that are focused onto the region of SLM 2 but fall outside of the phase pinhole are also rejected from the hologram. The points that fall partly within the phase pinhole will be attenuated in the recorded hologram, as their recorded fringe patterns will have a very limited aperture, rejecting most of their intensity. Most importantly, points whose images are out of focus on SLM 2 are either completely eliminated from the recorded hologram (if their light does not propagate through the phase pinhole) or their intensity is greatly diminished, first due to the out-of-focus illumination and then due to an additional rejection of most of the information, since only a small part of their cone of light can propagate through the phase pinhole. This mechanism allows optical sectioning, with a tradeoff; unlike the regular FINCH system 10 shown in FIG. 1, which records holograms that contain the complete 3D information of the wide-field illuminated scene, here only a single point in space is properly imaged in a single recorded hologram, and thus a scanning mechanism is required over the entire object 4.

Object 4 can be scanned either mechanically, by moving it in all directions (i.e., by translating the object in the x, y, and z axes), or electronically without any mechanical intervention. For example, in order to electronically control the position of the point illumination, an additional SLM or other beam steerers (acousto-optical or electro-optical) can be introduced into the illumination system to control the position of the point source illumination. As object 4 is scanned over the x,y-plane, the imaged point over SLM 2 is formed at different positions, and the phase pinhole mask can be electronically centered to that point. For each scanning position, (m,n), a single hologram is recorded (extracted from three exposures by a complete phase-shifting procedure). From each hologram a single point is reconstructed using the Fresnel diffraction integral formula for a single output point (a complete convolution is unnecessary), and all points from all of the recorded holograms are combined into a single image. Alternatively, from each hologram a reconstruction of the entire input plane can be calculated; then, for each single pixel of the hologram, the maximum intensity value from all reconstructions is chosen, and a complete reconstruction of a specific x,y-plane is formed. Just like in conventional confocal microscopy, many points can be imaged in parallel. This can be achieved, e.g., by illuminating multiple points on the same x,y-plane simultaneously, while a phase pinhole mask of multiple pinholes is displayed over SLM 2.

Of course, the distance between the illuminated points must be chosen so that proper optical sectioning can be achieved. It is also possible to electronically scan at different depths (z positions) by controlling the focal length of the converging lens displayed on SLM 1, but this will not allow a perfect overlap of the interfering beams on the CCD plane, and thus a resolution reduction is expected. A mechanical movement of the object at the z axis may then be preferred. This is a bearable cost, since this movement is only necessary once an x,y plane scan is completed. Note that alternative FINCH configurations can be used to achieve perfect overlap at different z distances without a mechanical movement. For example, this can be achieved by incorporating another SLM (as indicated by numeral 9 in FIG. 3), placed with its active axis perpendicular to the active axis of SLM 1, in which two SLMs are stacked together and a perfect overlap can be achieved for any desired point source object. This SLM can even replace the lens 7 ($L_c$) if needed.

As will be appreciated by the skilled person, the arrangement described in the figures results in a system that provides a fusion between the sectioning capabilities of confocal microscopy and the super-resolution capabilities of FINCH. Considering the proven suitability of FINCH for fluorescent microscopy together with parallel illumination arrangements and non-mechanical scanning schemes, the proposed system might have an important role in the microscopy world.

All the above will be better understood through the following illustrative and non-limitative examples, where the optical sectioning capabilities are experimentally demonstrated using a non-confocal FINCH system that incorporates a phase pinhole, emphasizing its contribution.

Experiments and Results

An experimental setup based on the configuration shown in FIG. 2 was implemented. In the experiments, a point source illumination system was not used; instead, the entire object was illuminated at all times. This is done in order to emphasize the contribution of the phase pinhole. Note that such systems, in which the sectioning is performed solely by the phase pinhole, can be useful whenever the observed scene cannot be selectively illuminated. In order to form a 1 cm thick object, a beam splitter (serving as a beam combiner) was used to position two Resolutions Charts (negative NBS 1963A), referred to as RC1 and RC2, at a distance of 30 cm and 31 cm away from the objective lens, respectively. The resolution charts were back-illuminated using two LEDs (Thorlabs LED635L). Diffuser sheets were attached to the resolution charts, so they can be considered as spatially incoherent sources. The focal lengths of the objective lens $L_o$ and the lens $L_c$ were chosen as $f_{obj}$=30 cm and $f_c$=150 cm, respectively. For simplicity, the two lenses were replaced with an equivalent lens $L_e$ of a focal length of $f_e$=25 cm. Other distances in the system were:

$L_e$ to SLM 1=10 cm;
SLM 1 to SLM 2=66.3 cm;
SLM 1 to the CCD 3=90 cm.

The two SLMs (Holoeye PLUTO, phase only modulation) were positioned with their active axes in parallel, while the two polarizers, P1 and P2, were set at a 45° angle to these axes. Since the SLMs are reflective, two beam splitters were incorporated into the system so that the SLMs were positioned orthogonally to the optical axis. This causes a loss of a large amount of light, which can be avoided either by positioning the SLMs at a small angle to the optical axis or by using transmissive components (see, e.g., G. Brooker, N. Siegel, J. Rosen, N. Hashimoto, M. Kurihara, and A. Tanabe, "In-line FINCH super resolution digital holographic fluorescence microscopy using a high efficiency transmission liquid crystal GRIN lens," Opt. Lett. 38, 5264-5267, 2013). Experiments were conducted using a regular FINCH system (setting the phase mask of SLM 2 to a constant zero modulation) and an optical sectioning FINCH system with a phase pinhole of a 44 µm radius displayed on SLM 2.

Figures 4A, 4B, 4C, 4D:
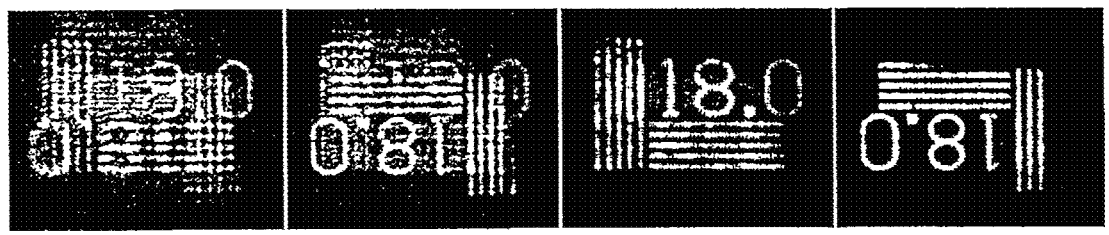
FIG. 4(a) shows an experimental results of FINCH reconstruction of a 18.0 cycles/mm resolution chart located 30 cm away from the objective lens.
FIG. 4(b) shows an experimental results of FINCH reconstruction of a 180° rotated 18.0 cycles/mm resolution chart located 31 cm away from the objective lens.
FIGS. 4(c) and 4(d) show experimental results of the optical-sectioning-FINCH reconstructions of the resolution charts of FIG. 4(a) and FIG. 4(b), respectively.

The x,y-plane scanning was performed with pinhole displacements in the x and y axes of 40 µm. Scanning at different depths (z-positions) was electronically achieved by controlling the focal length of the converging lens displayed on SLM 1, forming an image of either RC1 or RC2 over the plane of SLM 2. The experimental results are presented in FIG. 4. Reconstruction results from regular FINCH holograms are presented in FIGS. 4(*a*) and 4(*b*), for RC1 and RC2 respectively. Note how the out-of-focus targets (RC2 and RC1, respectively) greatly diminish the reconstruction quality. The equivalents of the reconstructions of FIGS. 4(a) and 4(b), resulting from the phase pinhole incorporated FINCH, are presented in FIGS. 4(c) and 4(d), respectively. Here, the out-of-focus targets are highly attenuated. As a result, the in-focus targets appear with much details, high contrast and weak background artifacts. Hence, the optical sectioning capabilities of the proposed system are clearly demonstrated. It is important to emphasize that once a point source illumination system is incorporated into the system, the sectioning capabilities are expected to be further enhanced.

It is important to mention that in traditional microscopy or imaging as shown in FIG. 5(a), the quality of in-focus objects (point A and its image point A') may be deteriorated by information from out-of-focus objects (point B and its image point B'). This situation is especially limiting when thick samples are considered. In this figure, the traditional microscopy comprises a detector 3 and an imaging system 51.

On the other hand, a system based on Minsky's confocal solution as shown in FIG. 5(b) and that includes a detector 3, an imaging system 51 a pinhole 21 and a point illumination system 8, (see, for example, R. H. Webb, "Confocal optical microscopy," Rep. Prog. Phys. 59, 427-471, 1996) incorporates two means to mitigate this problem: first, the point of interest is selectively illuminated (point A vs. point B) and second, image information from out-of-focus image points (e.g., point B') is mostly blocked, whereas information from the image point of interest (point A') freely reaches the detector 3. However, this solution is not without costs, as target scanning is now needed in order to image an entire object. Nevertheless, confocal microscopy is respectfully positioned at the gap between the commonly available conventional optical microscope and the more expensive electron microscope. As will be appreciated by a person skilled in the art, the phase pinhole arrangement proposed by the present invention can be integrated with such system.

All the above description and examples have been given for the purpose of illustration and are not intended to limit the invention in any way. Many different mechanisms, methods of scanning objects, electronic and logical elements can be employed, all without exceeding the scope of the invention.

The invention claimed is:

1. An arrangement for the generation of images of optical sections of a three-dimensional (3D) object in space comprising: an illumination unit for illuminating the object, an optical arrangement for the imaging of the object onto at least one spatially resolving detector by allowing light scattered or emitted from the illuminated object to be imaged onto said detector, a scanning mechanism for scanning the entire object and a signal processing unit for the implementation of a method for digital reconstruction of a three-dimensional representation of the object from images of said object as obtained by said detector, wherein the optical arrangement includes a phase pinhole, realized using a Spatial Light Modulator (SLM) configured to mimic an actual physical pinhole, while allowing the formation of a three-dimensional representation for a specific point of interest in said object, such that for each scanning position a single hologram or an image is recorded.

2. An arrangement according to claim 1, in which the phase pinhole is a circular area of a radius set to a uniform phase modulation, wherein for every scanning point the uniform phase modulation at the pinhole region is set to at least one phase value, wherein for a complete phase-shifting procedure the at least on phase value includes at least three different values.

3. An arrangement according to claim 2, in which the phase pinhole can be used with only a single phase value and an axicon to achieve optical sectioning, without using a phase-shifting procedure.

4. An arrangement according to claim 1, in which the phase pinhole is surrounded by a mask of an axicon.

5. An arrangement according to claim 1, in which the signal processing unit includes hologram calculating section configured to calculate the hologram of the object based on the image captured by the at least one spatially resolving detector that is used as an image recording device.

6. An arrangement according to claim 1, in which the scanning mechanism is done mechanically, by moving the object in all directions.

7. An arrangement according to claim 1, in which the scanning mechanism is done electronically without any mechanical intervention.

8. An arrangement according to claim 7, in which in order to electronically control the position of a point illumination, at least one beam steerer is introduced into the illumination unit as to control the position of the point source illumination, such that as the object is scanned over the x,y-plane, the imaged point over the SLM is formed at different positions, and the phase pinhole mask can be electronically centered to that point.

9. An arrangement according to claim 1, in which from each recorded hologram a single point is reconstructed using the Fresnel diffraction integral formula for a single output point, and all points from all of the recorded holograms are combined into a single image.

10. An arrangement according to claim 1, in which from each recorded hologram a reconstruction of the entire input plane of the object can be calculated; then, for each single pixel of the hologram, the maximum intensity value from all reconstructions is chosen, and a complete reconstruction of a specific x,y-plane is formed.

11. An arrangement according to claim 1, in which the obtained images are in a form of a hologram.

12. An arrangement according to claim 1, in which many points can be imaged in parallel, by illuminating multiple points on the same x,y-plane simultaneously, while a phase pinhole mask of multiple pinholes is displayed over the SLM.

13. A method for the generation of images of optical sections of an object, comprising:
   a) imaging an illuminated object onto at least one spatially resolving detector by using an optical arrangement that includes a phase pinhole that is realized using a Spatial Light Modulator (SLM) configured to mimic an actual physical pinhole, such that light scattered or emitted from the illuminated object that passes through said phase pinhole is being imaged onto said at least one spatially resolving detector as an obtained image; and
   b) scanning the entire object using a scanning mechanism for providing digital reconstruction of a three-dimensional representation of the object from images of the object as obtained by said detector, while allowing the formation of a three-dimensional representation for a specific point of interest in said object, such that for each scanning position a single hologram or an image is recorded.

* * * * *